United States Patent
Garner et al.

(10) Patent No.: US 12,122,870 B2
(45) Date of Patent: Oct. 22, 2024

(54) SYNTHESIS OF ENVIRONMENTALLY DEGRADABLE ALKYL POLYESTERS

(71) Applicant: Akina, Inc, West Lafayette, IN (US)

(72) Inventors: John Solomon Garner, West Lafayette, IN (US); Kinam Park, West Lafayette, IN (US)

(73) Assignee: Akina, Inc, West Lafayette, IN (US)

( * ) Notice: Subject to any disclaimer, the term of this patent is extended or adjusted under 35 U.S.C. 154(b) by 518 days.

(21) Appl. No.: 17/304,496

(22) Filed: Jun. 22, 2021

(65) Prior Publication Data

US 2021/0403639 A1 Dec. 30, 2021

Related U.S. Application Data

(60) Provisional application No. 63/044,162, filed on Jun. 25, 2020.

(51) Int. Cl.
| | | |
|---|---|---|
| *C08L 67/04* | (2006.01) | |
| *C08G 63/08* | (2006.01) | |
| *C08G 63/12* | (2006.01) | |
| *C08G 63/82* | (2006.01) | |
| *C08L 67/00* | (2006.01) | |

(52) U.S. Cl.
CPC .......... *C08G 63/12* (2013.01); *C08G 63/08* (2013.01); *C08G 63/82* (2013.01); *C08L 67/04* (2013.01); *C08L 2201/06* (2013.01); *C08L 2203/202* (2013.01); *C08L 2203/206* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 6,011,092 | A | 1/2000 | Seppala et al. |
| 8,288,470 | B2 | 10/2012 | Ansems et al. |
| 8,563,664 | B2 | 10/2013 | Seppala |

FOREIGN PATENT DOCUMENTS

| | | | | |
|---|---|---|---|---|
| GB | 575386 | | 2/1946 | |
| JP | 08239461 | A * | 9/1996 | ............. C08G 63/60 |
| JP | 2008095237 | A * | 4/2008 | |
| WO | 199631552 | | 10/1996 | |

OTHER PUBLICATIONS

Machine translation of JP-08239461-A (no date).*
Machine translation of JP-2008095237-A (no date).*
Commissioner for Patents; PCT International Search Report and The Written Opinion of the International Searching Authority; Sep. 28, 2021.
Feig; Vivian R., Tran, Helen, Bao, Zhenan; Biodegradable Polymeric Materials in Degradable Electronic Devices; ACS Cent Sci, Mar. 28, 2018; 4(3): 337-34. Published online Feb. 6, 2018 at 10,1021/acscentsci/7b00595.
AltaeTham, Weng Hong, Wahit, Mat Uzir, Mohae, Nadia; El-Hiti, Gamal A., Fahdil, Ayad, Sudesh, Kumar, and Yousif, Emad; Biodegradation of different formulations of polyhydroxybutyrate films in soil; SpringerPlus (2016) 5:762.
Tham, Weng Hong, Wahit, Mat Uzir, Kadir, Mohammed Rafiq Abdul, Wong, Tuck Whye, and Hassan, Onn; Polyol-based biodegradable polyesters: a short review; Rev Chem Eng 2016; 32(2); 201-221.

* cited by examiner

*Primary Examiner* — Michael J Feely
(74) *Attorney, Agent, or Firm* — Indiano Law Group, LLC; E. Victor Indiano; Rich Green

(57) ABSTRACT

A solid crosslinked polyester composition is disclosed wherein the crosslinked polyester is environmentally degradable in less than about 180 days. The crosslinked polyester is the polyesterification reaction product between one or more multi-hydroxylic alcohols, one or more hydroxy acids, and one or more multi-carboxylic acid compounds. Alternately, the crosslinked polyester is the polyesterification reaction product between one or more multi-hydroxylic alcohols, one or more hydroxy acids, one or more multi-carboxylic acid compounds, and a cyclic ester.

14 Claims, No Drawings

SYNTHESIS OF ENVIRONMENTALLY DEGRADABLE ALKYL POLYESTERS

CROSS-REFERENCE TO RELATED APPLICATIONS

This application claims the benefit under 35 U.S.C § 119(e) of U.S. Provisional Application No. 63/044,162 filed on Jun. 25, 2020, the entirety of the disclosure of which is incorporated herein by reference.

FIELD OF THE INVENTION

The present invention generally relates to the synthesis of alkyl polyesters, and more particularly, but not exclusively, to the synthesis of an environmentally degradable alkyl polyester which is degradable in the presence of water over a period of several months.

BACKGROUND

A polymer is a molecule that consists of many repeating parts or units. Polymers can be classified into synthetic and natural, water-soluble and water-insoluble, or degradable and non-degradable. Synthetic polymers can be further divided into thermoplastic and thermoset. Thermoplastics are pliable and easily reshaped, while thermosets cannot be reshaped due to extensive crosslinking between polymer chains. A variety of synthetic polymers, in particular plastics, have been used widely in commodity products and goods. However, most synthetic polymers are not biodegradable nor hydrolyzable in the natural environment. As such, plastic pollution is of increasing concern to the environment. Natural polymers include proteins, polysaccharides, and nucleic acids, and they are degradable. When degradation occurs in the human body or in the natural environment, it is also called biodegradation.

Since the first synthetic phenol-formaldehyde resins, known as Bakelite, were produced in the early 1900s, various thermoplastics and thermosets (both of which will be referred to as plastics) have become commonplace in our daily lives. Plastics efficiently perform their intended functions, are easily molded into various products, and have a production cost that is often so low that many plastic items are thrown away after a single use. While single-use plastics provide convenience to consumers, they have also resulted in serious environmental concerns.

Most commonly utilized synthetic plastics are not degradable in the environment. This has resulted in the uncontrolled buildup of plastics in the environment. It has become a severe environmental concern which is sometimes referred to as a "plastic pandemic." If we continue producing and utilizing plastics at current rates, it is suggested that there may be more plastic than fish in the oceans by the Year 2050. See e.g., https://www.washingtonpost.com/newsimorning-mix/wp/2016/01/20/by-2050-there-will-be-more-plastic-than-fish-in-the-worlds-oceans-study-says/. Non-degradable plastics may break down to smaller particles less than 5 mm, commonly known as microplastics, and even smaller nanoplastics less than 1 μm, which can be ingested by various sea creatures. Some of these sea creatures and the water in which microplastics and nanoplastics are present are consumed by humans.

Although a few environmentally degradable, synthetic plastics are available currently, their price is much higher than non-degradable plastics. In addition, most currently available environmentally degradable plastics do not have desirable mechanical (e.g., rigidity and/or tensile strength) and optical (e.g., transparency) properties compared with those of non-degradable plastics. Environmentally degradable synthetic plastics have rarely been used in consumer goods and packaging. Current methods of generating environmentally degradable materials for replacement of non-degradable plastics often include the integration of natural polymers (such as starch), making semi-synthetic polymers (e.g., grafting biodegradable polylactide (PLA) to cellulose), or synthesizing bioplastics (such as PLA, polyhydroxyalkanoates (PHAs), and poly(butylene succinate) (PBS).

The commercial-scale production of these materials, however, has been difficult due to the use of organic solvents and expensive chemical reagents. Previous work in generating polyfunctional, crosslinked biopolymers has primarily centered around using combinations of either pentaerythritol or glycerol with difunctionalized carboxylic acids (Liu et al. "Preparation and properties of a novel biodegradable polyester elastomer with functional groups." Journal of Biomaterials Science, Polymer Edition 20 (11): 1567-1578, 2009; Nagata et al. "Synthesis, characterization, and enzymatic degradation of novel regular network aliphatic polyesters based on pentaerythritol." Macromolecules 30 (21): 6525-6530, 1997.) Such plastics often require excessive heating during production and have lengthened degradation times with limited mechanical properties.

SUMMARY

One embodiment of the present invention is directed to the synthesis of an environmentally degradable alkyl polyester. Other embodiments include methods, and combinations for synthesizing an environmentally degradable alkyl polyester that is degradable in the presence of water within a period of about a few months.

As used herein, an environmentally degradable polyester generally refers to a polyester that degrades upon outdoor exposure, submersion in a body of water, soil burial, or composting rapidly enough to disappear visually in less than about 180 days and which may be further susceptible to biological attack resulting in conversion to biomass and/or water and carbon dioxide. It is understood that hydrolysis of the ester bonds in the polyester may occur. Typical environmental conditions that result in degradation of the environmentally degradable crosslinked polyesters described herein include temperatures from about 15° C. to about 45° C., the presence of water, and a pH range of from about 4 to about 8.

One form of the present application includes the synthesis of environmentally degradable alkyl polyesters with strong mechanical properties synthesized at lower reaction temperatures than those currently in use, without added catalysts or cyclic precursors. It has been found that these formed polyesters degrade in water within a matter of months. It has been discovered that these environmentally degradable alkyl polyesters include a range of mechanical strengths and elasticity, which make them suitable for a variety of applications. As such, these environmentally degradable, synthetic polymers can replace current non-degradable polymers in a variety of applications.

A non-limiting list of applications for the environmentally degradable, cross-linked polyesters described herein includes disposable commodity plastic components including temporary windows, plastic cutlery, toys, containers, plates, trays, tools, and the like; clear sheets used for lenses, see-through temporary protective barriers, and the like; electronic circuit backing plastic (e.g., a computer motherboard, electronic control panel), electrical insulation in disposable or quasi-disposable electronics (e.g., toys, disposable cameras, recording devices, and communications devices); environmentally degradable electronic circuits and/or components placed in electronic hardware to protect proprietary information; heat shielding; or degradable components in biomedical devices and drug delivery systems. It is appreciated that the environmentally degradable, cross-linked polyesters described herein may be ground or shredded and used as fillers for other polymers including other environmentally degradable, cross-linked polymers described herein.

In a non-limiting form of the present invention, beta hydroxy acids can self-catalyze the formation of polymers upon generating conditions suitable for the removal of water, e.g., increased temperature, reduced pressure, etc. Under normal conditions, a self-esterification reaction is only suitable for the generation of short-chain polyesters (polyester oligomers), which present as soft gelatinous materials with limited mechanical properties. The reaction with multifunctional alcohol-bearing polymers has been found to synthesize polyester-graft polymers with better mechanical properties than the polyester oligomers. Furthermore, the reaction in the presence of a mixture of multifunctional alcohols and multifunctional carboxylic acids can generate a crosslinked matrix with strong mechanical properties and useful degradability in the environment. This reaction can be performed with moderate heat (<200° C.) and without requiring the aid of additional catalysts or vacuum.

Based on the determined presence of esters and composition of ingredients, the chemical structure of the resulting polymer(s) is considered to include ester bonds connecting the alcohol units (of pentaerythritol for a non-limiting example) to the acid units (of lactic acid or citric acid for two non-limiting examples), and ester bonds connecting the acid units by ester bonds as well. Additionally, the acid units are connected to the alcohol units, and the alcohol unit of an acid may be connected to the acid units of the same acid or a neighboring acid. Throughout the structure, low molecular weight acids may be substituted with caprolactone moieties present as a minor component due to their lower incorporation. It is frequently found that polycondensation reaction conditions are not conducive to the formation of high molecular weight polymers from monomers such as lactic acid. From these considerations, it is expected that the formed polymer chains may be relatively low in molecular weight (<10,000 Da). These polyester oligomers by themselves would likely provide only a viscous semi-solid with little to no mechanical strength. Without being bound by theory, it is believed that a majority of the structural integrity and/or mechanical strength of the polymers disclosed herein is the result of the high crosslinking density provided via the plurality of multifunctional compounds, for example, citric acid and pentaerythritol.

The process by which these polymers are formed is a condensation reaction in which an alcohol moiety reacts with a carboxylic acid moiety to form an ester bond and release a water molecule. This reaction proceeds spontaneously at increased temperatures and can be catalyzed either by specific catalytic compounds or by acidic conditions. In this document, references to "prepolymer" indicate the application of conditions to start this reaction in a partial step. Some of the available alcohol and acid moieties react to form partially esterified oligomers that still exhibit either viscous/liquid flow or the ability to dissolve in organic solvents. The reference to "curing" indicates conditions applied which promote further condensation reactions to form a crosslinked polymer that is solid and resistant to dissolution by organic solvents or melting due to the crosslinked structure.

The production cost of these degradable polymers may be sufficiently low for these polymers to replace current non-degradable polymers in various applications. Further embodiments, forms, features, aspects, benefits, and advantages of the present application shall become apparent from the description provided herewith.

It is appreciated that one or more filler substances (e.g., silica, sand, salt, a cured polymer, fiberglass, cellulose, paper fiber, aluminum, and the like) may be added before polymerization to alter the properties of the synthesized polymer. Those properties include opacity, color, mechanical strength, stiffness, porosity, and the like.

DETAILED DESCRIPTION

One form of the present application includes the synthesis of environmentally degradable alkyl polyesters with strong mechanical properties synthesized at lower reaction temperatures than those currently used, without added catalysts or cyclic precursors. It has been found that these formed polyesters degrade in water within a matter of months. It has been discovered that these environmentally degradable alkyl polyesters include a range of mechanical strengths and elasticity, which make them suitable for a variety of applications. As such, these environmentally degradable, synthetic polymers can replace current non-degradable polymers in a variety of applications.

Several illustrative embodiments of the invention are described by the following clauses.

1. A composition comprising a solid crosslinked polyester wherein the crosslinked polyester is environmentally degradable in less than about 180 days and;
wherein the crosslinked polyester is the polyesterification reaction product between one or more multi-hydroxylic alcohols, one or more hydroxy acids, and one or more multi-carboxylic acid compounds; or
the crosslinked polyester is the polyesterification reaction product of one or more multi-hydroxylic alcohols, one or more hydroxy acids, one or more multi-carboxylic acid compounds, and a cyclic ester.

2. The composition of the preceding clause wherein the weight percent of the one or more multi-hydroxylic alcohols is about 5% to about 85%, the weight percent of the one or more multi-carboxylic acid compounds is about 5% to about 85%, and the weight percent of the one or more hydroxy acids is about 10% to about 90%, with the proviso that the total weight percent of the combined multi-hydroxylic alcohols, the multi-carboxylic acids compounds, and the hydroxy acids does not exceed 100%.

3. The composition of any one of the preceding composition clauses wherein the weight percent of the one or more multi-hydroxylic alcohols is about 5% to about 30%, the weight percent of the one or more multi-carboxylic acid compounds is about 5% to about 30%, and the weight percent of the one or more hydroxy acids is about 40% to about 90%, with the proviso that the total weight percent of the combined multi-hydroxylic alcohols, the multi-carboxylic acids compounds, and the hydroxy acids does not exceed 100%.

4. The composition of any one of the preceding composition clauses wherein the weight percent of the one or more multi-hydroxylic alcohols is about 5% to about 10%, the weight percent of the one or more multi-carboxylic acid compounds is about 5% to about 30%, and the weight percent of the one or more hydroxy acids is about 50% to about 70%, with the proviso that the total weight percent of the combined multi-hydroxylic alcohols, the multi-carboxylic acids compounds, and the hydroxy acids does not exceed 100%.

5. The composition of any one of the preceding composition clauses wherein catalysis for the esterification reaction is provided by the one or more hydroxy acids, the one or more multi-carboxylic acid compounds, or both the one or more hydroxy acids and the one or more multi-carboxylic acid compounds without additional metal or organic catalysts at a temperature from about 50° C. to about 200° C.

6. The composition of any one of the preceding composition clauses wherein the temperature is from about 100° C. to about 150° C.

7. The composition of any one of the preceding composition clauses wherein the crosslinked polyester has a Shore hardness score of at least 80.

8. The composition of any one of the preceding composition clauses wherein the crosslinked polyester degrades upon exposure to naturally occurring water at 30° C. losing at least about 80% of its mass in about two months.

9. The composition of any one of the preceding composition clauses wherein the one or more multi-hydroxylic alcohols is selected from the list consisting of pentaerythritol, dipentaerythritol, tripentaerythritol, glycerol, adonitol, cellulose, cellulose-ether derivatives, starch, poly(vinyl alcohol), dextran, alginic acid, hyaluronic acid, and chitosan.

10. The composition of any one of the preceding composition clauses wherein the one or more multi-carboxylic acid compounds is selected from group consisting of citric acid, poly(acrylic acid), isocitric acid, aconitic acid, propane-1,2,3-tricarboxylic acid, and trimesic acid.

11. The composition of any one of the preceding composition clauses wherein the one or more hydroxy acids is selected from the list consisting of lactic acid, glycolic acid, 3-hydroxypropionic acid, 3-hydroxybutanoic acid, and salicylic acid.

12. The composition of any one of the preceding composition clauses wherein the multi-hydroxylic alcohol is pentaerythritol.

13. The composition of any one of the preceding composition clauses wherein the multi-carboxylic acid compound is citric acid.

14. The composition of any one of the preceding composition clauses wherein the hydroxy acid is D,L-lactic acid.

15. The composition of any one of the composition clauses wherein the multi-hydroxylic alcohol is pentaerythritol, the multi-carboxylic acid compound is citric acid, and the hydroxy acid is D,L-lactic acid.

16. The composition of any one of the preceding composition clauses, wherein the cyclic ester is selected from the list consisting of caprolactone, propiolactone, butyrolactone, valerolactone, acetolactone, lactide, and glycolide.

17. The composition of any one of the preceding composition clauses wherein the solid crosslinked polyester is mechanically rigid.

18. The composition of any one of the preceding composition clauses further comprising one or more additives selected from the list consisting of polyols, chain-extenders, surfactants, cyclic esters, alcohols, metal-catalysts, poly(ethylene glycols), and hydroxy acids to modify the mechanical properties of the crosslinked polyester.

19. The composition of any one of the preceding composition clauses further comprising one or more filler substances added before polymerization to alter one or more properties of cross-linked polyester polymer selected from the group consisting of opacity, color, mechanical strength, stiffness, and porosity.

20. The composition of the preceding composition clause wherein the filler is selected from the list consisting of silica, sand, salt, a cured polymer, fiberglass, cellulose, paper fiber, and aluminum 21. A process for preparing the crosslinked polyester of clause 1 comprising the steps of:
　a) preparing a mixture of one or more multi-hydroxylic alcohols, one or more multi-carboxylic acid compounds, one or more hydroxy acids, and optionally a cyclic ester;
　b) preparing a prepolymer by heating the mixture at about 40° C. to about 100° C. for from about 1 to about 168 hours in a sealed container with mixing to yield a partially esterified prepolymer; and
　c) heating the prepolymer at a temperature of about 90° C. to about 300° C. for from about 1 to about 168 hours with open access to air or vacuum to yield the crosslinked polyester.

22. The process of the preceding process clause wherein the mixture includes about 5% to about 85% weigh percent of the one or more multi-hydroxylic alcohols, about 5% to about 85% weight percent of the one or more multi-carboxylic acid compounds, and from about 10% to about 90% weigh percent of the one or more hydroxy acids with the proviso that the combined weight percentage of the one or more multi-hydroxylic alcohols, the one or more multi-carboxylic acid compound, and the one or more hydroxy acids does not exceed 100%.

23. The process of any one of the preceding process clauses wherein the mixture includes about 5% to about 30% weigh percent of the one or more multi-hydroxylic alcohols, about 5% to about 30% weight percent of the one or more multi-carboxylic acid compounds, and from about 40% to about 90% weigh percent of the one or more hydroxy acids with the proviso that the combined weight percentage of the one or more multi-hydroxylic alcohols, the one or more multi-carboxylic acid compound, and the one or more hydroxy acids does not exceed 100%.

24. The process of any one of the preceding process clauses wherein the mixture includes about 5% to about 10% weigh percent of the one or more multi-hydroxylic alcohols, about 5% to about 30% weight percent of the one or more multi-carboxylic acid compounds, and from about 50% to about 70% weigh percent of the one or more hydroxy acids with the proviso that the combined weight percentage of the one or more multi-hydroxylic alcohols, the one or more multi-carboxylic acid compound, and the one or more hydroxy acids does not exceed 100%.

25. The process of any one of the preceding process clauses wherein the one of more multi-hydroxylic alcohols is selected from the list consisting of pentacrythritol, dipentaerythritol, tripentaerythritol, glycerol, adonitol, cellulose, cellulose-ether derivatives, starch, poly(vinyl alcohol), dextran, alginic acid, hyaluronic acid, and chitosan.

26. The process of any one of the preceding process clauses wherein the one of more multi-carboxylic acid compounds is selected from group consisting of citric acid, poly(acrylic acid), isocitric acid, aconitic acid, propane-1,2,3-tricarboxylic acid, and trimesic acid.

27. The process of any one of the preceding process clauses wherein the one or more hydroxy acids is selected from the list consisting of lactic acid, glycolic acid, 3-hydroxypropionic acid, 3-hydroxybutanoic acid, and salicylic acid.

28. The process of any one of the preceding process clauses wherein the multi-hydroxylic alcohol is pentaerythritol, 29. The process of any one of the preceding process clauses wherein the multi-carboxylic acid compound is citric acid.

30. The process of any one of the preceding process clauses wherein the hydroxy acid is D,L-lactic acid.

31. The process of any one of the preceding process clauses wherein the multi-hydroxylic alcohol is pentaerythritol, the multi-carboxylic acid compound is citric acid, and the hydroxy acid is D,L-lactic acid.

32. The process of any one of the preceding process clauses, wherein the cyclic ester is selected from the list consisting of caprolactone, propiolactone, butyrolactone, valerolactone, acetolactone, lactide, and glycolide.

33. The process of any one of the preceding process clauses wherein the prepolymer is generated by incubating at temperatures from about 30° C. to about 90° C. for about 1 to about 250 hours.

34. The process of any one of the preceding process clauses wherein the prepolymer is heated at from about 110° C. to about 170° C. for from about 1 to about 250 hours to yield the crosslinked polyester.

35. The process of any one of the preceding process clauses wherein one or more additives selected from the list consisting of polyols, chain-extenders, surfactants, cyclic esters, alcohols, metal-catalysts, poly(ethylene glycols), and hydroxy acids is added to the mixture to modify the mechanical properties of the crosslinked polyester.

36. The process of any one of the preceding process clauses wherein one or more filler substances added to the mixture before polymerization to alter one or more properties of cross-linked polyester polymer selected from the group consisting of opacity, color, mechanical strength, stiffness, and porosity.

37. The process of the preceding process clause wherein the filler is selected from the list consisting of silica, sand, salt, a cured polymer, fiberglass, cellulose, paper fiber, and aluminum 38. The process of any one of the preceding process clauses wherein the solid crosslinked polyester is mechanically rigid.

39. The process of any one of the preceding process clauses where the prepolymer is heated in a mold.

40. The process of any one of the preceding process clauses wherein wires or other electrical components are embedded within the prepolymer before step c) to obtain a crosslinked polyester containing the embedded electrical components.

For purposes of promoting an understanding of the principles of the invention, reference will now be made to the following exemplary embodiments, and specific language will be used to describe the same. It will nevertheless be understood that no limitation of the scope of the invention is thereby intended, any alterations and further modifications in the illustrated device, and any further applications of the principles of the invention as illustrated therein being contemplated as would usually occur to one skilled in the art to which the invention relates.

EXPERIMENTAL METHODS

In synthesizing environmentally degradable polymers based on multifunctional acids and multi-hydroxy alcohols, various natural polymers were used as additional components to form polymers of different properties. Many natural polymers were tested for solubility in L-lactic acid (Sigma Aldrich, cat #27715-1L-R) or D, L-lactic acid (Sigma Aldrich cat #W261106) to form a homogenous polymer structure. This was done by physically mixing 0.5 g cellulose with 5 mL lactic acid and shaking at 50° C. overnight in an orbital shaker (Southwest Science, IncuShaker-Mini) at 100 rpm. The celluloses used include Hydroxypropylmethocellulose (HPMC Methocel, K100 M Dow Chemical), Ethocellulose (HC Ethocel Standard 20, Dow Chemical), Cekol 2,000 (CPKelco), Cekol 30,000 (CPKelco), hydroxyethylcellulose (HEC 250 M PHARM, Hercules), ethylcellulose (EC)(Aldrich), hydroxypropyl methylcellulose (HPMC) (Aldrich), hydroxypropyl cellulose (HPC)(HPC-Kluce-LF, Klucel LF Pharm), HPC 95,000 (Hercules), HPC 1,150,000 (Hercules), HPC EF PHARM (Hercules), HPC 910,000 (Nippon Soda Co.), and HPC grade H fine powder (Nisso). Of the celluloses tested, HPC exhibited good solubility in lactic acid.

Corn starch (Kroger, SKU 11110-03841) was observed to be poorly dissolved/dispersed in lactic acid at a concentration of 19% (w/v) after shaking at 50° C. overnight at 100 rpm. The starch, however, dissolved easily at this concentration when heated to 105° C. in a sealed container for 5.5 h. Pectin (Kroger, SKU 11110-67384) was observed to be dissolved at a concentration of 16.6% w/v after shaking at 50° C. overnight at 100 rpm.

FTIR spectra were collected using a Nicollet Avatar 380 spectrometer operated by Omnic software. Scanning was performed for the spectral region from 400 to 4000 $cm^{-1}$ with 32 scans averaged with background subtraction against the empty IR chamber. The results were displayed in transmission mode, and the primary peaks were identified and numbered.

For NMR measurements, each sample was massed, and a portion was dissolved with shaking at room temperature in 0.8 mL of $CDCl_3$ (Aldrich). The solution was subsequently transferred into 7-inch×5 mm HNMR tubes (Wilmad LabGlass, SKU #WG-1000-7). The tube was inserted into an NMReady-60e instrument (Nanalysis, 60 MHz), and HNMR spectra were collected between 64-256 scans. Spectra processed on ACD/Spectrus software (2015 Pack 2, Version S40S41, Build 79720). Due to instrumental parameters reversed spectra orientation, set phase correction to Ph0=338, and performed baseline correction according to spectral averaging. Primary peaks were identified, numbered, and integrated.

Mechanical analysis was performed by cutting samples into the standard testing dogbone shape and loaded into a mechanical tester (TA.XTplus, Texture Technologies). The cross-sectional area was measured using calipers, and the sample was retracted at a crosshead speed of 1 mm/sec. Analysis was performed using Exponent software (Stable Microsystems). The linear portion of the slope of the stress-strain curve at a small strain (<1%) was determined to obtain the elastic modulus. The maximum stress encountered before rupture was recorded as the tensile strength, and the strain at rupture was recorded as extensibility.

Degradation analysis was performed by soaking small portions of indicated samples in water, which was collected from a pond in West Lafayette, Indiana, which was passed through a paper filter. Herein the water collected from the natural environment is referred to as "naturally occurring water." Non-limiting examples of "naturally occurring water" include ocean water, lake water, pond water, river or stream water, sewer water, suburban storm runoff water, ground water, agricultural runoff water, and the like. The use of naturally occurring water free from efforts to clean or sanitize it (e.g., chlorination or other sanitation done on potable tap water) will likely provide a better representation of the expected degradation performance in the natural environment. The test pieces were left in the water at 30° C./100 rpm agitation for predetermined periods and observed for signs of degradation. The pieces were weighed before and after degradation to quantify mass loss due to degradation. A person of ordinary skill in the art would understand that mass loss in these tests is an indicator of the environmental degradability of the crosslinked polyesters described herein.

As used herein multi-hydroxy alcohols generally refer to compounds that have more than two hydroxyl groups. It is understood that such compounds may contain additional functional group. Non-limiting examples of multi-hydroxyl alcohols include pentaerythritol, dipentaerythritol, tripentaerythritol, glycerol, adonitol, cellulose, cellulose-ether derivatives, starch, poly(vinyl alcohol), dextran, alginic acid, hyaluronic acid, chitosan, and the like.

As used herein, the term multi-carboxylic acid compounds generally refer to compounds that have more than two carboxylic acid groups. It is understood that such compounds may contain additional functional groups. Non-limiting examples of multi-carboxylic acid compounds include citric acid, poly(acrylic acid), isocitric acid, aconitic acid, propane-1,2,3-tricarboxylic acid, trimesic acid, and the like.

Experiments were performed in triplicate, and the values are presented as average ±standard deviation with N=3 unless specified otherwise.

Example 1

Hydroxypropyl Cellulose-Lactic Acid

A 250 mL round bottom flask, a magnetic stir bar, and a short-arm distillation head with a vacuum adapter were acetone rinsed and dried in a 100° C. oven, then cooled to room temperature in a desiccator chamber. 10.0 g hydroxypropyl cellulose (HPC, Nisso) and 42.0 mL L-lactic acid were added to the flask with a stirring bar; a spatula was used to combine the L-lactic acid and HPC as much as possible. The reaction flask was placed on an aluminum heating block atop a heating mantle. The reaction flask was sealed with a glass stopper, heated to 50° C. overnight with 350 rpm stirring. The next day, the stopper was removed and replaced with the distillation head, equipped with a 100 mL receiving (waste) flask. The reaction flask was heated to 130° C. for 1 h with 500 rpm stirring, then raised to 150° C. with a vacuum (approximately −3 inHg) (Thermo Electron Corp UVS800DDH) for 12 h. Afterward, the reaction was allowed to cool to room temperature, still under vacuum. The resultant product was a translucent, deep amber color, mechanically rigid, and sticky to the touch.

Dichloromethane was added to the reaction flask, which was then placed on a room temperature orbital shaker to dissolve the polymer. The resulting solution was passed through a paper filter into stirring hexane. The solids were collected into a wide-mouth jar and dried under vacuum at 55° C. (−31 inHg, vacuum oven). The resultant polymer was doughy with a dark brown color. The formed polymer was assayed using Fourier Transform Infrared Spectroscopy (FTIR), and peaks were observed as strong peaks at 1095, 1128, and 1749, weaker peaks at 1456, 1653, and 1194, and broad peaks at 2939 and 3392 (1/cm). NMR indicated broad peaks at 5.0-5.2 ppm (10.00 integration), 4.1-4.6 ppm (10.90 integration), 3.28 ppm (17.77 integration), and 1.14-1.60 ppm (39.82 integration). The FTIR shows the presence of ester bonds (peak at 1749 $cm^{-1}$), while the NMR data indicate the presence of polylactide (peaks near 5.2 and 1.5 ppm) and cellulose (peaks near 3.5 to 4.0 ppm). The NMR and FTIR data indicate the formation of short PLA chains on the hydroxypropyl cellulose. The generated product was assayed by gel permeation chromatography (GPC) which indicated a number average molecular weight of 14,826 Da with a weight average molecular weight of 27,430 Da.

Example 2

Starch-Lactic Acid 1.90 g corn starch and 10 mL of L-lactic acid were added to a 20 mL glass vial. The vial was shaken vigorously and incubated at 50° C. with orbital agitation at 100 rpm overnight. The sealed vial was placed in a 105° C. oven for approximately 30 min. The mixture was poured onto a flat ceramic dish and placed in an oven at 105° C. for 18-19 h. The solid material from the plate was cut using a razor blade. Starch and L-lactic acid did not dissolve together until they were heated to 105° C. The resultant tan-colored solid was brittle and prone to hard shattering. It was soluble in water and dimethyl sulfoxide, but not dichloromethane.

Example 3

Pectin-Lactic Acid

Into a 20 mL glass vial were added 1.66 g fruit pectin and 10 mL of L-lactic acid. The vial was shaken vigorously and incubated at 50° C. with orbital agitation at 100 rpm overnight. Pectin dissolved quickly in L-lactic acid at 50° C. The mixture was poured onto a flat ceramic dish and placed in an oven at 105° C. for 5-6 h. The solid material was cut using a razor blade. The resultant tan-colored solid was very stretchy, flexible, and slightly adhesive. It was soluble in water and dimethyl sulfoxide, but not dichloromethane.

Example 4

Hydroxypropyl Cellulose-Sebacic Acid-Glycolic Acid-Lactic Acid

Into a 20 mL glass vial were added 0.99 g of hydroxypropyl cellulose (HPC, Klucel), 1 mL of L-lactic acid, 4 mL of glycolic acid (70% technical grade, Aldrich cat #420603), and 0.17 g sebacic acid (Aldrich cat #84809-100G). This mixture was shaken vigorously and incubated at 50° C. with orbital agitation at 100 rpm for 6 days. The mixing was poor. The mixture was transferred onto a tared flat ceramic dish and heated at 105° C. overnight (e.g., between 16-24 h). After cooling over desiccant (CaSO4, Drierite), the sample was weighed to obtain the yield mass and cut into pieces. The film was stretchy but tough. The reaction yield from weighing before and after on the tared ceramic plate was 34% (w/w).

Example 5

1,6-Hexanediol-Succinic Acid-Hydroxypropyl Cellulose-Glycolic Acid-Lactic Acid

Into 20 mL glass vial were added 2.16 g 1,6-hexanediol (Aldrich cat #H11807-500G), 2.19 g succinic acid (Aldrich cat #398055-500G), and 4.22 g glycolic acid. The vial was shaken vigorously then incubated at 50° C. with orbital agitation at 100 rpm overnight. The following day, 0.26 g of hydroxypropyl cellulose and 1.00 g of L-lactic acid were added. When the sealed vial was heated to 105° C. in an oven, the components melted and mixed. The content was poured onto a ceramic dish and left overnight (e.g., between 16-24 h) at 105° C. The reaction solution did not solidify, and no solid polymer formed from the reaction. Simply mixing any acid and diol does not lead to the formation of plastics with the desired characteristics.

Example 6

Paper Pulp-Citric Acid-Lactic Acid

Shredded office paper was mashed in with 85-90% L-lactic acid solution with vigorous agitation to form a slurry of 7% w/v paper in L-lactic acid. 21.81 g of this mixture was combined with 1.01 g of citric acid (Aldrich #C0759) and shaken 50° C./100 rpm over 3 days, followed by heating to 100° C. in an oven for 3 h and transferring solution into tared silicone molds. This was reacted in open-air at 130° C. overnight (16-24 h). The reaction resulted in a hardened brown mash. Reaction yield by mass was determined to be 52%.

Example 7

Glycerol-Citric Acid-Lactic Acid

Into 20 mL glass vial were placed 2.17 g of glycerol (Aldrich, Cat #49770-250 ml), 4.58 g of citric acid, and 7.58 g of D,L-lactic acid. The vial was shaken at 50° C. and 100 rpm overnight, put on a rotator to agitate at room temperature for 30 min, heated at 100° C. for 5 h, put in a 130° C. oven for 10 min, and then returned to 50° C./100 rpm shaking for another night. This process converted the mixture from a slurry to a brown liquid. Subsequently, the polymer was poured into a silicone mold and reacted open to air at 130° C. overnight (16-24 h). The obtained piece was filled with bubbles and adhered so firmly to the silicone mold that it ripped the mold upon removal, and the piece broke.

Example 8

Mannitol-Citric Acid-Lactic Acid

Into a 20 mL glass vial were placed 3.70 g of mannitol (SPI pharm 112-1005-50DF8), 8.07 g of citric acid, and 10.16 g of D,L-lactic acid. The vial was shaken at 50° C. and 100 rpm overnight, put on a rotator to agitate at room temperature for 30 min, heated at 100° C. for 5 h, put in a 130° C. oven for 10 min, and then returned to 50° C./100 rpm shaking for another night. This process converted the mixture from a slurry to a brown liquid. Subsequently, the polymer was poured into a silicone mold and reacted open to air at 130° C. overnight (e.g., 16-24 h). The obtained piece was an expanded foam filled with bubbles and adhered so strongly to the silicone mold that it ripped the mold upon removal, and the piece broke. A portion was cut, weighed, and placed into a vial filled with local pond water and incubated at 30° C./100 rpm agitation. After the first two days, the piece was visibly swollen and breaking down. The piece was kept shaking for 50 days and then removed and left at room temperature for one day. The remaining solids were collected onto a tared paper filter and weighed. The before and after degradation weights were compared (0.0383 g after/1.3389 g before) and the mass loss over 50 days of incubation was determined to be 97%.

EXAMPLE 9

Pentaerythritol-Lactic Acid or Citric Acid-Lactic Acid

Two separate reactions were performed using either multifunctional acid or multifunctional alcohol, individually without the other compound. These reactions demonstrated that the use of only one or the other component could form a polymeric material but that material lacks the crosslinking found in the polymer including a the combination of the two compounds.

In a glass jar, 12.53 g pentaerythritol and 49.62 g DL lactic acid were combined and shaken at 60° C./100 RPM to disperse. The mixture was reacted in an open-top jar on a magnetic hotplate with stirring at 150° C./12 hours/350 RPM. The formed material was cured at 130° C. in an oven for 2 days. It yielded a clear, transparent gel with a reaction yield of 69% by mass. The resultant polymer was found to be soluble in acetone, suggesting it was not highly crosslinked.

In another glass jar, 12.19 g citric acid and 54.17 g lactic acid were combined and shaken at 60° C./100 RPM to disperse. The mixture was reacted on an open-top jar on a magnetic hotplate with stirring at 150° C./12 hours/350 RPM. The formed material was cure at 130° C. in an oven for 2 days. It yielded a transparent, yellow, hard solid with a reaction yield of 65% by mass. The resultant polymer was found to be soluble in acetone, suggesting it was not highly crosslinked.

Example 10

Pentaerythritol-Citric Acid-Lactic Acid

Into a 20 mL glass vial were placed 2.37 g of pentaerythritol (Acros Organics, Cat #129872500), 2.52 g of citric acid, and 3.94 g of D,L-lactic acid. The vial was shaken at 50° C./100 rpm overnight, put on a rotator to agitate at room temperature for 30 min, heated in a vial at 100° C. for 5 h, put in a 130° C. oven for 10 min, and then returned to 50° C./100 rpm shaking for another night. This process converted the mixture from a slurry to a brown liquid. Subsequently, the polymer was poured into a silicone mold and reacted open to air at 130° C. overnight (16-24 h). The obtained piece was light but extremely hard and slightly brittle. The reaction yield was ~64% by mass (5.68 g piece/8.83 g ingredients). A portion was cut, weighed, and placed into a vial filled with local pond water and incubated at 30° C./100 rpm agitation. After the first two days, the piece was observed to be visibly swollen and breaking down. The piece was kept shaking for 50 days, after which time it was removed and cooled for one day to room temperature. The remaining solids were collected onto a tared paper filter and weighed. The before and after degradation weights were compared (0.0915 g after/1.6853 g before) and the mass loss over 50 days of incubation was determined to be 95%.

In another experiment following the same procedure, the amounts of the ingredients were changed to 2.32 g of pentaerythritol, 2.48 g of citric acid, and 11.49 g of D,L-lactic acid. The obtained piece was lightweight but extremely hard and brittle. The reaction yield was ~54% by mass. The degradation study showed 95% degradation over 50 days.

Example 11

Pentaerythritol-Citric Acid-Lactic Acid

Into a 20 mL glass vial were placed 5.31 g pentaerythritol, 5.63 g citric acid, and 8.81 g D,L-lactic acid. The vial was shaken at 50° C./100 rpm over three days, followed by heating to 100° C. in an oven for 3 h. The solution was transferred into tared silicone molds and reacted in open-air at 130° C. overnight (e.g., 16~24 h). The prepared plastic was transparent and hard, with slight bubbles inside. The reaction yield by mass was 76%. A piece was left at room temperature for 2 months open to the air. The plastic piece became more flexible after one month but retained overall strength for up to 2 months.

Example 12

Pentaerythritol-Citric Acid-Lactic Acid: Component Ratio Testing

A series of prepolymers were produced with varying contents of citric acid and pentaerythritol dissolved in lactic acid. For each prepolymer, the various compositions were generated using the indicated quantities of citric acid, pentaerythritol, and lactic acid in 20 ml scintillation vials. The prepolymers were generated by shaking at 100-150 RPM with heating at 60-80° C. for 1-2 weeks until a clear solution was formed. The solutions were cast in tared, shallow aluminum dishes and reacted at 130-150° C. in an oven over 1-2 days with weighing before and after curing to obtain reaction yield (% mass).

A: Composition made of 1.02 g citric acid, 4.02 g of pentaerythritol, and 10.03 g of lactic acid. Dissolved fully in 18 days. Reacted at 150° C. for 2 days forming a sticky, yellow, gelatinous solid (62% w/w reaction yield).

B: Composition made of 1.99 g citric acid, 3.00 g of pentaerythritol, and 10.08 g of lactic acid. Dissolved at 60° C. in II days. Reacted overnight at 130° C. followed by another night at 150° C. forming a brittle, yellow, weak solid (59% w/w reaction yield).

C: Composition made of 2.50 g citric acid, 2.49 g of pentaerythritol, and 10.03 g of lactic acid. Dissolved at 60° C. in 11 days. Reacted overnight at 130° C. followed by another night at 150° C. forming a hard, clear solid (58% w/w reaction yield).

D: Composition made of 2.64 g citric acid, 2.50 g of pentaerythritol, and 10.03 g of lactic acid. Dissolved at 60° C. in II days. Reacted overnight at 130° C. followed by another night at 150° C. forming a hard, clear solid (59% w/w reaction yield).

E: Composition made of 3.01 g citric acid, 2.02 g of pentaerythritol, and 10.04 g of lactic acid. Dissolved at 60° C. in 11 days. Reacted overnight at 130° C. followed by another night at 150° C. forming a hard, clear solid (56% w/w reaction yield).

F: Composition made of 4.02 g citric acid, 1.02 g of pentaerythritol, and 10.06 g of lactic acid. Dissolved at 60° C. in 11 days. Reacted overnight at 130° C. followed by another night at 150° C. forming a dark yellow, hard solid (55% w/w reaction yield).

Example 13

Pentaerythritol-Citric Acid-4Lactic Acid (PC4L

An oligomeric prepolymer, herein referenced as "PC4L," was generated by stirring together 50.14 g pentaerythritol, 53.06 g citric acid, and 201.11 g D,L-lactic acid at 60° C. in a glass jar for 1 week. Aliquots (5 mL) of liquid PC4L were transferred into scintillation vials and combined with the additives listed in Table 1, and vortexed/shaken to combine. These polymers were reacted in tared aluminum foil pans at 130° C. for 3 days, cooled, and tested.

The samples were compressed at a crosshead speed of 0.5 mm/sec using a TA.XTplus texture analyzer (30 kg load cell) equipped with a ¼ inch steel ball probe at a preset force of 1.111 Newtons for 15 seconds to match the conditions of a Shore Hardness 000 test. The depth of penetration (mm) at 15 seconds was multiplied by 39.37 and subtracted from 100 to convert to the Shore hardness scale. If the probe penetrated completely through the material, it was assigned a hardness of 0 for full penetration.

The addition of tetraethylene glycol to the reactive mix did not provide any mechanical strength, while PEG 400, glycerol, and ethylene glycol resulted in higher strength (Shore Hardness of 77~92%). All other additives provided Shore Hardness above 96%. A baseline comparison for the level of the mechanical strength was provided by testing four familiar materials. The Shore hardness of polydimethylsiloxane (silicone rubber), nylon 6-6, wood (pine), and brass were 87.8±5.8, 96.7±0.3, 97.2±0.5, and 99.5±0.02, respectively. The results indicate that the mechanical strength of the polymers can be adjusted using different additives.

TABLE 1

Shore hardness of mixtures with various additives.

| Mixture | Base | Additive | Reaction yield | Shore Hardness |
|---|---|---|---|---|
| 1 | 5 mL PC4L | (none, control) | 62% | 98.6 ± 0.4 |
| 2 | 5 mL PC4L | 0.1 mL stannous octanoate | 64% | 98.7 ± 0.4 |
| 3 | 5 mL PC4L | 1 mL glycolic acid (70%) | 58% | 98.4 ± 0.3 |
| 4 | 5 mL PC4L | 1 mL caprolactone | 65% | 96.9 ± 0.4 |
| 5 | 5 mL PC4L | 1 mL tetraethylene glycol | 65% | 0.0 |
| 6 | 5 mL PC4L | 1 mL propylene glycol | 51% | 97.7 ± 0.5 |
| 7 | 5 mL PC4L | 0.7 mL glycerol | 64% | 89.4 ± 1.8 |
| 8 | 5 mL PC4L | 1 mL PEG 400 | 63% | 77.2 ± 3.5 |
| 9 | 5 mL PC4L | 0.5 mL Polysorbate 20 | 63% | 96.8 ± 0.3 |
| 10 | 5 mL PC4L | 1 mL ethylene glycol | 53% | 91.6 ± 2.2 |
| 11 | 5 mL PC4L | 1 mL ethanol (200 proof) | 54% | 98.6 ± 0.3 |

Transparency was assayed by UV-Vis absorption. Briefly, each sample was machined down to a rectangular chip of ~1 cm×3 cm in size. This chip was measured with calipers (Manostat) to obtain thickness and loaded into the cuvette holder in a spectrophotometer (Genesys 10S UV-Vis). The samples were then scanned in the range from 200~900 nm against the air as a blank to obtain % transmittance (Table 2). Samples that were too mechanically soft or brittle to be machined by this method were excluded from this test.

The optical properties of the material are also affected by the incorporation of additives ranging from materials that provide good optical clarity across a wide range of light spectra (examples: PC4L alone, propylene glycol, or ethanol addition) or have attenuated transmittance at low wavelengths indicating potential usage for ultra-violet light blocking applications (examples: polysorbate 20, glycolic acid). These tests indicate that the properties of the new polymers can be adjusted by the incorporation of additives to adjust mechanical and optical poperies.

TABLE 2

UV-Vis transmittance (%) of mixtures at various wavelengths.

| Mix-ture | % Transmittance at wavelength (am) | | | | | | | | Thickness (mm) |
|---|---|---|---|---|---|---|---|---|---|
| | 200 | 300 | 400 | 500 | 600 | 700 | 800 | 900 | |
| 1 | 0.09 | 7.00 | 78.48 | 87.83 | 89.00 | 89.51 | 89.47 | 88.65 | 1.9 |
| 2 | 0.09 | 5.19 | 72.42 | 85.21 | 87.72 | 88.57 | 88.86 | 88.14 | 1.8 |
| 3 | 0.09 | 5.19 | 72.44 | 85.18 | 87.74 | 88.54 | 89.05 | 88.18 | 2.0 |
| 6 | 0.09 | 7.25 | 78.34 | 86.26 | 87.43 | 87.69 | 88.04 | 87.15 | 1.4 |
| 9 | 0.07 | 0.31 | 53.88 | 81.98 | 86.76 | 87.73 | 88.08 | 87.29 | 1.8 |
| 1 | 0.09 | 8.44 | 78.79 | 86.87 | 88.05 | 88.44 | 88.80 | 87.82 | 1.7 |

Example 14

Pentaerythritol-Citric Acid-4Lactic Acid (PC4L

A reactive precursor PC4L was prepared, processed by mixing with the additives listed in Table 3, and characterized as described in Example 13. The results are shown in Table Transparency was assayed as described in Example 13, and the results are shown in Table 4.

TABLE 4

UV-Vis transmittance (%) of mixtures at various wavelengths.

| Mix-ture | % Transmittance at wavelength (nm) | | | | | | | | Thickness (mm) |
|---|---|---|---|---|---|---|---|---|---|
| | 200 | 300 | 400 | 500 | 600 | 700 | 800 | 900 | |
| 12 | 0.08 | 1.22 | 68.49 | 85.52 | 87.57 | 88.28 | 88.60 | 88.04 | 1.5 |
| 13 | 0.08 | 1.80 | 73.99 | 85.10 | 86.40 | 86.89 | 86.98 | 86.43 | 2.0 |
| 14 | 0.08 | 0.92 | 66.88 | 82.19 | 84.61 | 85.73 | 86.20 | 85.96 | 1.6 |
| 15 | 0.07 | 0.14 | 55.89 | 84.06 | 87.64 | 88.45 | 88.77 | 87.86 | 1.9 |
| 16 | 0.07 | 0.08 | 49.21 | 81.09 | 86.19 | 87.27 | 87.65 | 87.15 | 1.7 |
| 17 | 0.09 | 2.82 | 76.69 | 86.94 | 88.07 | 88.38 | 88.54 | 87.73 | 1.5 |
| 18 | 0.09 | 5.00 | 75.21 | 85.10 | 86.63 | 87.26 | 87.60 | 87.03 | 1.5 |
| 19 | 0.07 | 0.77 | 55.31 | 74.75 | 80.17 | 82.80 | 84.32 | 84.48 | 1.6 |
| 20 | 0.09 | 2.28 | 77.83 | 87.18 | 88.14 | 88.51 | 88.73 | 87.85 | 1.6 |
| 21 | 0.09 | 1.74 | 77.52 | 86.74 | 87.61 | 87.95 | 88.34 | 87.10 | 1.7 |
| 22 | 0.08 | 0.10 | 69.30 | 85.40 | 87.55 | 88.14 | 88.37 | 87.50 | 1.8 |
| 23 | 0.08 | 0.04 | 67.38 | 85.10 | 87.12 | 87.61 | 87.88 | 86.94 | 1.7 |
| 24 | 0.08 | 0.67 | 59.41 | 83.20 | 87.85 | 88.86 | 88.98 | 88.64 | 1.2 |
| 25 | 0.09 | 2.90 | 74.40 | 85.13 | 86.69 | 87.21 | 87.39 | 86.75 | 1.4 |
| 26 | 0.08 | 2.53 | 71.91 | 84.57 | 86.59 | 87.37 | 87.63 | 86.86 | 1.8 |
| 28 | 0.09 | 3.60 | 75.21 | 86.52 | 88.21 | 88.55 | 88.53 | 87.82 | 1.5 |
| 29 | 0.08 | 2.30 | 60.18 | 73.36 | 77.32 | 79.92 | 82.16 | 82.48 | 1.7 |
| 30 | 0.08 | 2.83 | 72.79 | 85.13 | 86.85 | 87.46 | 87.81 | 87.25 | 1.8 |
| 31 | 0.09 | 2.83 | 72.80 | 85.10 | 86.97 | 87.44 | 87.75 | 87.13 | 1.8 |

TABLE 3

Shore hardness of mixtures with various additives.

| Mixture | Base | Additive | Reaction yield | | Shore Hardness |
|---|---|---|---|---|---|
| 12 | 5 mL PC4L | 0.5 mL glycolic acid (70%, technical) | 56% | Slightly yellow, clear, brittle | 99.5 ± 0.4 |
| 13 | 5 mL FC4L | 0.5 mL caprolactone | 63% | Slightly yellow, clear, hard | 99.6 ± 0.2 |
| 14 | 5 mL PC4L | 0.35 mL glycerol | 62% | Slightly yellow, clear, hard, | 98.7 ± 0.3 |
| 15 | 5 mL PC4L | 0.5 mL PEG 400 | 63% | Clear, yellow | 99.3 ± 0.3 |
| 16 | 5 mL PC4L | 0.25 mL polysorbate 20 | 62% | Clear, dark yellow | 98.8 ± 0.4 |
| 17 | 5 mL PC4L | 0.5 mL ethylene glycol | 55% | Slightly yellow, clear | 98.8 ± 0.3 |
| 18 | 5 mL PC4L | 0.5 mL ethanol (100%) | 56% | Clear, yellow, hard | 98.3 ± 0.3 |
| 19 | 5 mL PC4L | 0.05 mL stannous octanoate | 63% | Clear, yellow, hard | 98.5 ± 0.5 |
| 20 | 5 mL PC4L | 0.5 mL 1,4-butanediol | 56% | Clear, slightly yellow, brittle | 99.3 ± 0.1 |
| 21 | 5 mL PC4L | 0.5 g 1,6-hexanediol | 59% | Clear, slightly yellow, flexible | 99.0 ± 0.5 |
| 22 | 5 mL PC4L | 0.5 g 1,10-decanediol | 62% | Clear, yellow | 93.4 ± 1.9 |
| 23 | 5 mL PC4L | 0.5 g 1,12-dodecanediol | 63% | Clear, yellow | 94.6 ± 2.7 |
| 24 | 5 mL PC4L | 0.5 g 1,16-hexadecanediol | 62% | Clear, dark yellow, hard | 96.0 ± 2.1 |
| 25 | 5 mL PC4L | 0.5 g 1,2-propanediol | 54% | Clear, slightly yellow | 99.4 ± 0.1 |
| 26 | 5 mL PC4L | 0.5 g 2,3-butanediol | 57% | Clear, slightly yellow | 98.9 ± 0.3 |
| 27 | 5 mL PC4L | 0.5 mL tetraethylene glycol | 62% | Clear, yellow, flexible, weak | 84.9 ± 4.3 |
| 28 | 5 mL PC4L | 0.5 mL propylene glycol | 57% | Yellow flexible, clear | 99.3 ± 0.3 |
| 29 | 5 mL PC4L | none | 61% | Slightly yellow, clear, hard | 98.6 ± 0.3 |
| 30 | 5 mL PC4L | none | 62% | Slightly yellow, clear, hard | 99.4 ± 0.0 |
| 31 | 5 mL PC4L | none | 62% | Slightly yellow, clear, hard | 99.2 ± 0.1 |

For reaction kinetics testing, 40 mg of PC4L premix was placed in open-topped Differential Scanning Calorimetry (DSC) pan for running in DSC (Q2000, TA instruments) isothermal at 130 TC for 10 hours. The data was imported into Microsoft excel, and the beat-flow was reversed (multiplied by −1 for the endotherm) to create a positive data set for plotting. The data was plotted, and a trendline was generated using the exponential function. The resultant trendline was calculated to be $y=10.145x^{-0.404}$, where y is −heat flow and x is time.

5 mL of PC41L premix was placed in aluminum weigh dishes and weighed prior to placing in a 130° C. oven. The dishes were removed and allowed to cool to room temperature before weighing at specific time points (Table 5). This test was performed in triplicate.

TABLE 5

Mass changes of PC4L as a function of reaction time up to 120 hours.

| Mixture | Mass (g) | | | | | |
|---|---|---|---|---|---|---|
|  | t = 0 | t = 2 h | t = 4 h | t = 24 h | t = 96 h | t = 120 h |
| 29 | 6.7257 | 4.9379 | 4.8154 | 4.5696 | 4.4591 | 4.4475 |
| 30 | 6.9080 | 5.0855 | 4.9533 | 4.6963 | 4.5828 | 4.5705 |
| 31 | 6.9872 | 4.9388 | 5.0164 | 4.7588 | 4.6429 | 4.6308 |

The percent mass loss was 27±2% (2 hours), 28±0.1% (4 hours), 32:0.1% (24 hours), 34±0.1% (96 hours), and 34±0.1% (120 hours).

Example 15

Pentaerythritol-Citric Acid-4Lactic Acid (PC4L-80

The liquid PC4L mixture was heated with magnetic stirring in an open-topped bottle at 80° C. for 12 hours to render a highly viscous prepolymer (herein referenced as PC4L-80C). The viscosity of this prepolymer was measured as 63,600 cP using a Brookfield LVDVE rotational viscometer using a #63 spindle rotating at 1 RPM at room temperature (19° C.). Separately, a portion of the PC4L liquid precursor was poured into an aluminum flat-dish and heated in a vacuum oven at 90° C. under vacuum overnight (16-24 hrs). The obtained PC4L (PC4L-90CV) after 90° C. vacuum drying was too viscous to pour or move at room temperature other than scooping with a spatula. The prepolymer was heated in an oven at 100° C. for 5-15 minutes, which rendered it fluid enough to pour into aluminum molds coated with PTFE release spray (VDX, Microcare) and high-vacuum grease (Dow). The subsequent reaction at 160° C. formed a solid plastic.

Example 16

Pentaerythritol-Citric Acid-4Lactic Acid-Silica Gel

Viscous prepolymer PC4L-80C (7.3974 g) was mixed with silica gel powder (Celite® Hyflo Supercel) (0.9086 g) by stirring with a spatula and then cured at 160° C. for 16-24 hours. The resultant polymer was opaque brown and very stiff. The obtained mass (%) polymer/reactants was 70% (including the weight of filler). Additionally, the PC4L-80C (7.5013 g) was mixed with sand (sieved between 53-600 μm in size)(2.6142 g) in an aluminum dish and cured at 160° C. overnight. The obtained plastic with sand particles was slightly brown colored. The obtained mass (%) polymer/reactants was 79% (including the weight of filler).

Example 17

Pentaerythritol-Citric Acid-4Lactic Acid: Degradation

The liquid prepolymer of Example 15, PC4L-80C, was cured in an aluminum weigh-boat at 130° C. overnight. A portion was cut and transferred 1.0134 g of cured polymer into a 20 ml glass scintillation vial and added 20 ml of deionized (≥18 mOhm, obtained from Easypure II, Barnstead Thermolyne). Incubated solution at 50° C. with orbital agitation at 100 RPM for 7 days. The material was observed to be fully dissolved to a clear solution. The pH of the resultant solution was measured using a pH meter (VWR) and determined to be 1.95, which is consistent with the acidic products (lactic acid, citric acid) expected to be generated as part of degradation. The solution was concentrated by rotary evaporation (RE-100 Pro, Scilogex) and assayed according to FTIR (Avatar 380, Nicolet) and NMR (NMReady-60e, Nanalysis). The obtained data were compared to published data (SDBSWeb: https://sdbs.db.aist-.go.jp (National Institute of Advanced Industrial Science and Technology, Jun. 29, 2020).

Degradation product FTIR major peaks present at 3200-3600 (broad), 2900-3100 (broad), 1714 (strong), 1201 (sharp), 1120 (sharp), 1037 (sharp), all peaks expressed as 1/cm, respectively. For NMR, peaks were present at indicated ppm location with (relative integration in parenthesis): 1.35 ppm (4.64), 1.47 ppm (4.72), 1.59 ppm (1.34), 2.98 ppm (2.83), 3.60 ppm (4.42), 4.21 ppm (3.10), 4.33 ppm (1.21), 4.45 ppm (0.98), 4.56 ppm (0.45), 4.71 ppm (10.00), 5.07 ppm (0.61). 5.15 ppm (0.58), and 5.28 ppm (0.60), respectively. The peak assignments are listed in Table 6. These moieties (alcohol, carbonyl, alkane) are represented in the putative degradation products lactic acid, citric acid, and pentaerythritol.

TABLE 6

The FTIR peaks assignments.

| Peak location | Assigned Moiety |
|---|---|
| 3200-3600 (broad) | Alcohol (O—H Stretching) |
| 2900-3100 (broad) | Alkane (C—O stretching) |
| 1714 (strong) | Carbonyl (C=O) |
| 1201 (sharp) | Alcohol C—OH |
| 1120 (sharp) | Alcohol C—OH |
| 1037 (sharp) | Alcohol C—OH |

The NMR data (Table 7) is consistent with the input chemicals as well as smaller quantities of residual oligomeric esters derived there-from including short-chain poly(lactides), citrate-lactides, pentaerythritol-lactides and other compounds which are consistent with a primarily degraded polyester.

TABLE 7

The NMR peaks assignments.

| Peak ppm (integration) | Chemical Attribution (—H) |
|---|---|
| 1.35 ppm (4.64) | Lactic methyl (—CH3) |
| 1.47 ppm (4.72) | Lactic methyl (—CH3) |

TABLE 7-continued

The NMR peaks assignments.

| Peak ppm (integration) | Chemical Attribution (—H) |
|---|---|
| 1.59 ppm (1.34) | Lactic methyl (—CH3) |
| 2.98 ppm (2.83) | Citric acid (—CH2—COOH) |
| 3.60 ppm (4.42) | Pentaerythritol (—CH2—OH) |
| 4.21 ppm (3.10) | Lactic acid (—CH—CH3(—COOH)) |
| 4.33 ppm (1.21) | Pentaerythritol (—CH2—OH) |
| 4.45 ppm (0.98) | Lactide ester (—CH—CH3(—C=O—)) |
| 4.56 ppm (0.45) | Lactide ester (—CH—CH3(—C=O—)) |
| 4.71 ppm (10.00) | Water (D2O blank peak) |
| 5.07 ppm (0.61) | Poly(lactide) Oligo ester (—CH—CH3(—C=O— lactide)) |
| 5.15 ppm (0.58) | Poly(lactide) Oligo ester (—CH—CH3(—C=O— lactide)) |
| 5.28 ppm (0.60) | Poly(lactide) Oligo ester (—CH—CH3(—C=O— lactide)) |

Example 18

Pentaerythritol-Ethyl Lactate-Citric Acid-Lactic Acid

Into a 20 mL glass vial were placed 2.34 g of Pentaerythritol, 2.46 g of citric acid, 6.27 g of D,L-lactic acid, and 2.53 g of ethyl lactate. The vial was shaken at 50° C. and 100 rpm overnight, put on a rotator to agitate at room temperature for 30 min, heated at 100° C. for 5 h, put in a 130° C. oven for 10 min, and then returned to 50° C./100 rpm shaking for another night. This process did not convert the mixture from a slurry to a brown liquid and resulted in heterogeneous slurry.

Example 19

Pentaerythritol-Citric Acid-Caprolactone

Citric acid (3.8831 g), pentaerythritol (3.7246 g), and caprolactone (2.38 g) were added into a scintillation vial, mixed, and a portion was placed into a 2-part mold while leaving the rest in a vial to react at 130° C. in the oven for 3 days. The 2-part mold material leaked at the seam, but the mixture reacted to form a bubbly white plastic.

In another experiment, citric acid (1.1801 g) and pentaerythritol (1.3366 g) were added into an aluminum weigh boat, stirred together with a spatula, and compressed using a 7/16 inch tablet mold. The mixture was reacted overnight at 130° C. in an oven for 3 days. After reacting, the mixture was found to have melted and formed a hard, bubbly whitish plastic.

Example 20

Pentaerythritol-Citric Acid-Caprolactone-Lactic Acid

Into a glass bottle were added 25.25 g of pentaerythritol, 26.80 g citric acid, 4.43 g caprolactone (Alfa Aeser), and 94.1 g D,L-lactic acid. The solution was heated with a magnetic stir bar at 60° C./500-800 rpm over 6 days. Then, it was reacted over 1-3 days at 130° C. on a variety of surfaces. A portion was reacted overnight on top of a silicone mold. A reaction yield by mass was 63%. Clear, hard plastic strongly adhered to the silicone mold. Similar adhesion which prevented demolding was obtained when cured on top of glass, aluminum, brass, Teflon, and steel surfaces. The only observable difference between the surfaces was that the polymer reaction solution partially corroded the steel surface. Surfaces coated with poly(vinyl acetate) (PVAc), gelatin, and polycaprolactone failed to produce removable polymer as either the additive corrupted the polymer reaction (gelatin) or failed to prevent the polymer from seeping through to attach to the surface (PVAc or polycaprolactone). Curing the mixture on a silicone mold coated with Teflon anti-stick spray (VDX) provided for a piece that could be removed from the surface, and this piece was used for subsequent tests.

This piece was tested for machinability by taking a sheet of cured plastic to cut using a conventional band-saw which enabled cut pieces. The piece was also ground using a Dremel sanding tip and observed to grind/smooth readily. Complex shapes, e.g., fork and comb, were quickly produced. They were strong enough for typical usage in intended applications. When soaked in water overnight, they became very soft and flexible. This process was accelerated in water at a higher temperature.

Example 21

Pentaerythritol-Citric Acid-Caprolactone-Lactic Acid

Into a glass bottle were added 50.09 g pentaerythritol, 53.20 g citric acid, 10.09 g caprolactone, and 200.35 g L-lactic acid (85% v/v). The solution was stirred at 60° C./500-800 rpm for 6-7 days to react to form the liquid precursor. The liquid precursor was placed on a series of surfaces and treated at 130° C. for 1-3 days to form the hardened plastic. This formulation is herein referenced as "M317".

The precured liquid precursor was tested for viscosity at 21° C. using a Brookfield Model LVDVE rotational viscometer equipped with a #31 spindle. The viscosity was measured at varying rotation speeds: 312 cP at 5 rpm; 339 cP 10 rpm; 359 cP at 30 rpm. This indicates relatively little shear thickening/thinning effects. The density of the solution was 1.26 g/mL. FTIR spectra showed strong peaks at 1715-1722, 1203, 1120, 1041, and broad peaks at 3400, 2941, and 2985 $cm^{-1}$. The HNMR (Nanalysis 60 MHz) measurement showed peaks in the 5.01-5.24 ppm (1.51 integration), 4.17-4.51 ppm (10.00), 3.57-3.73 ppm (0.99), 2.35-2.46 ppm (1.11), 2.14 ppm (0.72), and 1.32-1.60 ppm (11.66), consistent with the presence of esters, acids, and alcohols. After curing at 130° C., the FTIR peak at 1714 increased in intensity relative to the other peaks indicating a higher degree of ester formation. The reaction efficiency was measured in triplicate as 61±0.2% on a mass basis.

The generated solid sheet was cut into dogbone shapes using conventional machining techniques and tensile-tested on a TA.XTplus mechanical tester at a crosshead speed of 1 mm/sec. The elastic modulus of the small-strain linear region (0.1-1% strain) was determined to be 4.8±1.6 MPa, the tensile strength was determined to be 31.0±19.2 MPa, and the extensibility was determined to be 5.3:1.6%, indicating that the material is mechanically robust enough to be used as a plastic substitute in several commodity applications.

Example 22

Pentaerythritol-Citric Acid-Caprolactone-Lactic Acid: Stoichiometric Equivalent Samples Into a large bottle, 70.56 g citric acid, 25.19 g pentaerythritol, 195.02 g of lactic acid, and 9.53 g of caprolactone were added. This was stirred at 60° C. for a week followed by stirring at 80° C. for an additional week. The prepolymer resin was tested by Brookfield spindle viscometer using a #31 spindle rotating at 5 RPM in a small-sample adapter on a model LVDVE rotational viscometer at 20±1° C. The viscosity was determined to be 864 cP. The solution was poured into a tared aluminum dish and cured overnight at 160° C. The subsequently formed polymer was dark amber with mechanically brittle properties and surface tackiness, preventing removal from the aluminum dish in one piece. The reaction yield was determined to be 30% weight yield by comparing the mass before and after curing.

This example represents a stoichiometric equivalent of carboxylic acid moieties (3 equivalents from citric acid, 1 equivalent from lactic acid, 1 equivalent from caprolactone) to hydroxyl moieties (4 equivalents from pentaerythritol, 1 equivalent from lactic acid, 1 equivalent from caprolactone). Despite providing for a more stoichiometrically balanced reaction condition, the yield and mechanical properties of the resulting polymer were worse, indicating that the results from other examples are not expected and, thus, surprising.

Combining ~1-3 g of PC4L with 0.5-1.0 g of sodium chloride and curing at 160° C. overnight yielded a dark brown foamy polymer which was hard to the touch and highly heat resistant. Combining ~1-3 g of PC4L with 0.5-1.0 g of water and curing at 160° C. overnight yielded a polymer similar to conventionally cured PC4L with no noticeable difference. Combining ~1-3 g of PC4L with 0.5-1.0 g of acetone and curing at 160° C. overnight yielded a slightly thinner and more brittle polymer.

Example 23

Pentaerythritol-Citric Acid-Caprolactone-Lactic Acid

The formulation of M317 (as described in Example 21) was heated at 80° C. for 12 hours to form a highly viscous prepolymer. The prepolymer was tested for viscosity by a Brookfield model LVDVE spindle viscometer with a small sample adapter and #31 spindle rotating at 5 RPM and were determined to have a viscosity of 1,978±201 cP (for 3 independent batches generated).

Samples of cured M317 were cut (0.6-0.7 gram flat chips) and weighed to obtain initial mass. These were placed in 20 ml scintillation vials and water from a local pond (West Lafayette, IN). These were incubated with 100 RPM orbital agitation at 30° C. for 2 months. Subsequently, the degraded products were passed through tared paper filters to collect the remaining solids. These were dried and weighed again to obtain the degradation mass loss. This was determined to be 93±1% (N:=3) mass loss after 2 months of incubation.

A piece of cured M317 was machined down to a ~1×3×0.2 $cm^{-3}$ rectangle. This was fitted into a Genesys 10S UV-Vis spectrophotometer and analyzed for % transmittance at indicated wavelengths in Table 8.

For electrical resistance usage, samples of cured M317 were cured as flat, 1-mm pieces. A digital multimeter (Gardner Bender Model GDT-311) was fitted to the piece and tested for electrical resistance. At the maximum scale setting (2000K Ohm), the multimeter still indicated no conductance of electricity, indicating the cured plastic has an electrical resistance greater than 20 MOhm/mm. Two thin wires (20 gauge) were lowered into liquid prepolymer of M317 (Example #21) and reacted at 130° C. The wires were observed to be fully embedded in the cured, transparent polyester with no noticeable damage or corrosion. The wires were fitted on one side with a green LED light and on the other side with two LR44 type button batteries in sequence (3V). Connecting the wires completed the circuit through the wired embedded in the polyester lighting the LED, indicating the potential for the developed polyester to be used for electrical circuitry applications as a backing layer or non-conductive support.

Example 24

Pentaerythritol-Citric Acid-Caprolactone-Lactic Acid (M317): Borax Catalyst

Into an aluminum dish were added 0.2316 g of borax (20-Mule Team brand) and 14.3676 g liquid M317 prepolymer. The mixture was stirred with a spatula and reacted at 130° C. over 3 days. The formed plastic was filled with air bubbles, and the bottom was hard and slightly brown. The yield was 73% reaction mass. Borax catalyst effect was further tested by mixing a series of catalysts with M317 prepolymer.

Control (0% borax): M317 prepolymer was cured in an oven at 130° C. in an aluminum boat for 5 day. It formed clear, hard plastic with 67±0.2% reaction yield (N=2).

0.5% Borax: 0.0498 g borax was combined with 10.1678 g M317 prepolymer with shaking in a 20 ml glass vial at 60° C. for 2 days, and then reacted at 130° C. in an aluminum boat for 5 days. It formed clear, hard plastic with 65:1.1% reaction yield (N:=3).

1% Borax: 0.1027 g borax was combined with 10.0259 g M317 prepolymer with shaking in a 20 ml glass vial at 60° C. for 2 days, and then reacted at 130° C. in an aluminum boat for 5 days. It formed bubbly, hard plastic with 66±0.2% reaction yield (N=2).

5% Borax: 0.5136 g borax was combined with 10.0131 g M317 prepolymer with shaking in a 20 ml glass vial at 60° C. for 2 days, and then reacted at 130° C. in an aluminum boat for 5 days. It formed bubbly, hard plastic with 70±0.5% reaction yield (N=3)

Example 25

Pentaerythritol-Citric Acid-Caprolactone-Lactic Acid (M317): Sulfuric Acid Catalysis M317 prepolymer (12.48 g) and 250 µL of concentrated sulfuric acid were combined in an aluminum dish, mixed,

TABLE 8

UV-Vis transmittance (%) of mixtures at various wavelengths.

| Type | % Transmittance at wavelength (mn) | | | | | | | | Thickness (mm) |
|---|---|---|---|---|---|---|---|---|---|
| | 200 | 300 | 400 | 500 | 600 | 700 | 800 | 900 | |
| M317 (Example 21) | 0.1 | 0.8 | 72.9 | 87.1 | 88.6 | 88.9 | 89.0 | 87.8 | 2.0 | and reacted at 130° C. overnight along with control of M317 prepolymer without sulfuric acid. The sulfuric acid-catalyzed reaction was observed to form a brown-bottom/white bubbly hard solid with 75% reaction yield by weight, while the control was still tacky and brittle with a 73% reaction yield by weight.

Further testing was performed in duplicate. A control was created by taking 10.2731 g M317 prepolymer in a scintillation vial at 100 RMP/37° C. (no additive). Sulfuric acid was added to make 0.1% (10.2273 g M317 prepolymer and 10.2 µL sulfuric acid), 1% (10.1975 g M317 prepolymer and 102.0 µL sulfuric acid), and 5% (10.2085 g M317 prepolymer and 510 µL sulfuric acid). All mixtures were mixed overnight at 37° C./100 RPM, then put into weigh boats, and reacted at 130° C. for 3 days. The control and 0.1% sulfuric acid were clear films. The 1% sulfuric acid formulation yielded one clear film and one bubbly film, Both 5% sulfuric acid samples yielded bubbly, brown-colored plastics. The control, 0.1%, 1%, and 5% sulfuric acid reactions had 68±0.5%, 72±1.0%, 73±2.0%, and 64±1.8% reaction yields, respectively, by mass (N=2).

Example 26

Pentaerythritol-Citric Acid-Caprolactone-Lactic Acid (M317): Poly(Dimethylsiloxane) (PDMS) Molding A series of items (small nail, hook-screw, razor-blade, machine washer) placed on a ceramic dish and covered with liquid PDMS (Sylgard 184, base and initiator mixed 10:1 ratio according to manufacturer instructions). The PDMS was crosslinked overnight at 60° C., then peeled off the ceramic dish, and the embedded items were removed, leaving behind the void of the indicated item. M317 prepolymer was filled into the voids and shook at 80 RPM/60° C. for overnight to pre-cure, then vacuum (KNF diaphragm pump) degassed (−3 inHg) in a vacuum desiccator (Nalgene) for 10 min followed by curing at 130° C. for 3 days. The prepolymer cured to form rigid structures in the shape of the void of the PDMS template. During removal, the items adhered firmly to the PDMS such that the PDMS was damaged during the removal. Despite this, this example demonstrates the potential for the material to be cure-molded into the desired shape.

Example 27

Pentaerythritol-Citric Acid-Caprolactone-Lactic Acid (M317): Polymeric Additives M317 prepolymer was combined with the following additives with shaking at 60° C. for 7 days to disperse/dissolve, followed by reacting at 130° C. for 3 days.

901A: 9.4199 g M317 prepolymer and 1.0174 g poly (vinyl alcohol) were mixed to form a clear gel and reacted to create tan-orange plastic with 71% reaction yield by mass.

901B: 10.0065 g M317 prepolymer and 0.9615 g poly (vinyl acetate) were mixed to form a yellow gel and reacted to create tan-orange plastic with 69% reaction yield by mass.

901C: 10.1487 g M317 prepolymer and 1.0126 g poly (caprolactone) were mixed to form a partially liquified mixture. It was reformed at room temperature and tended to float on top of M317, reacted to create clear, hard plastic with 69% reaction yield by mass. It is noted that poly (caprolactone) melts at 60° C.

901D: 9.9730 g M317 prepolymer and 0.9851 g poly (acrylic acid) were mixed to form a solution with a gel sunk to the bottom and reacted to create clear, hard plastic with 70% reaction yield by mass.

901E: 10.5073 g M317 prepolymer and 1.0487 g poly (dimethylsiloxane)(PDMS) (Sylgard 184 base) were mixed to form a whitish slurry and reacted to create cloudy, opaque plastic with 76% reaction yield by mass.

901F: 10.1610 g M317 prepolymer, 1.0476 g poly(vinyl alcohol), and 1.0816 g poly(acrylic acid) (Aldrich Cat #323667) were mixed to form a sticky, clear, particulate gel and reacted to create heterogeneous plastic with 72% reaction yield by mass.

The material can be mixed with polymeric additives, and the resulting properties of the reacted mixtures are dependent on the additives.

Example 28

Pentaerythritol-Citric Acid-Caprolactone-Lactic Acid (M317): Fiberglass Interpenetrating Network A square piece of fiberglass (commercial insulator) and M317 prepolymer were added to an aluminum weigh boat and reacted at 130° C. over 7 days. It formed a hard, yellowish composite material with the plastic reacted into the fiberglass. The reaction yield (polymer only, without the mass of fiberglass) was 74% by mass.

Example 29

Pentaerythritol-Citric Acid-Caprolactone-Lactic Acid (M317): Ground Nuplon Filler Fully cured M317 was added into a grinder (Agatemorter, MTI Corporation, SFM-8) and ground to a powder. The powder was filtered through a #20 mesh sieve to separate larger-sized portions. The ground filler powder (0.6201 g) was mixed with M317 prepolymer (3.9570 g) with 100 RPM shaking at 60° C. The mixture was observed to create a more viscous prepolymer with the near-complete dissolution of the ground filler, indicating that the prepolymer has the potential to rehydrolyze/redissolve the filler.

Example 30

Pentaerythritol-Citric Acid-Caprolactone-Lactic Acid (M317): Oil-Reacted Beads

A mixture of M317 prepolymer (~50 ml) and silicone oil (Dow 200 fluid) was placed into a 500 mil round-bottomflask with an oval stir bar and reacted with stirring at 350 RPM at 150° C. for 12 hours. A portion of the polyester reacted at the bottom of the flask formed into whitish spherical beads of many sizes ranging from millimeter to centimeter scale.

Example 31

Pentaerythritol-Citric Acid-Caprolactone-Lactic Acid (M317): Radiation Sterilization Impact The possible sterilization impact on the polymer properties was evaluated using a set of M317 flat pieces (cured at 150° C.) cut with dimensions of 2 mm thick×1 cm wide×3 cm in length. All pieces were stored in a plastic zipper-sealed bag, with three of the pieces were stored at room temperature as control. Three pieces were submitted for e-beam sterilization at 20 kGy radiation dose (performed by E-BEAM Services, Inc. using a 1.5 MeV, 75 kW accelerator, located at 3400 Union St. Lafayette, IN 47903). The shore hardness (Type 000) of the returned pieces and the control pieces were assayed using a TA.XTplus mechanical tester equipped with a 30 kg load cell and ¼ inch steel ball probe. The control piece shore hardness was determined to be 98.8±0.3 (N:=3). The shore hardness of a 20 kGy-sterilized piece was determined to be 99.3±0.2 (N=3). The pieces were assayed for UV-Vis transmittance using a Genesys 10S spectrophotometer against an air-blank. The transmittance for the control plastic was 0.0643±0.0002 (200 nm), 0.017±0.001 (300 nm), 27.1±0.3 (400 nm), 70.6±1.8 (500 nm), 77.4±1.6 (600 nm), 79.5±1.4 (700 nm), 80.7±1.2 (800 nm), and 80.6±1.3 (900 nm)(N=2). The transmittance for the 20 kGy-sterilized material was 0.056±0.001 (200 nm), 0.016±0.001 (300 nm), 19.6±2.4 (400 un), 63.6±8.2 (500 nm), 73.4±8.1 (600 nm), 77.1±7.5 (700 nm), 79.2±6.8 (800 nm), and 79.5±6.1 (900 nm) (N=2). The pieces were tested on a three point-bend test using the TA.XTplus mechanical tester using a 3 mm knife and 15 mm holder distance. The crosshead speed was set to 1 mm/sec, and the pieces were compressed until they snapped in half. The maximum force (Newtons) and distance of deflection (mm) at break was determined using Exponent software. The force at break of the control pieces was 240.14±20.40 N and the deflection was 1.35±0.08 mm (N=3). The force at break of the 20 kGy sterilized pieces was 273.26±62.53 N, and the deflection was 1.55±0.25 mm (N=3). The mechanical properties and color of the pieces were observed not to be drastically affected, indicating that e-beam sterilization is a viable option.

Example 32

Pentaerythritol-Citric Acid-Caprolactone-Lactic Acid-Polysorbate 20-Caprolactone Into a plastic bottle were added 154.61 g of M317 prepolymer, 7.96 g polysorbate 20 (Spectrum Chemical Cat #P0132), and 7.68 g caprolactone (Ortec). The mixture was shaken at 60° C./100 RPM overnight to create a prepolymer herein designated as M924. Subsequently, this prepolymer was reacted at 130° C. in an aluminum weigh boat for 3 days yielding a clear, flexible plastic with 71% reaction yield by mass. The M924 prepolymer mix was coated onto a polysorbate 20 coated aluminum foil and reacted at 130° C. for 3 days. The polymer reacted to form a thin layer across the foil, indicating the potential to coat metals.

Example 33

Multi-Hydroxy Alcohols

In addition to pentaerythritol, other multi-hydroxyl alcohols, such as dipentaerythritol, adonitol, and trimethylolpropane, were also tested, as shown in Table 9. The mixtures were pre-polymerized at 60-80° C. and heat-cured at 130-150° C. as previously described. The cured samples were compressed at a crosshead speed of 0.5 mm/second using a TA.XTplus texture analyzer (30 kg load cell) equipped with a ⅜ inch steel ball probe at a preset force of 1.111 Newtons for 15 seconds to match the conditions of a Shore Hardness 000 test. The depth of penetration (mm) at 15 seconds was multiplied by 39.37 and subtracted from 100 to convert to the Shore hardness scale, the same as previously described. Samples were tested in triplicate. The Shore hardness values of these samples indicate that the plastics prepared with various multi-hydroxyl alcohols have substantially similar strength to the previous formulation created with pentaerythritol (Table 3) with shore hardness scores ranging in the 98-99 range.

TABLE 9

Plastics made of multi-hydroxyl alcohols.

| Ingredients | | | | |
|---|---|---|---|---|
| Alcohol (g) | | Citric Acid (g) | Lactic Acid (g) | Shore Hardness |
| Dipentaerythritol | (0.6644) | 1.0033 | 8.0198 | 98.4 ± 0.6 |
| Adonitol | (0.4769) | 1.0032 | 8.0195 | 98.2 ± 0.6 |
| Trimethylolpropane | (0.6981) | 1.0030 | 8.0029 | 99.0 ± 0.3 |

Example 34

Multifunctional Acids

Testing was performed to evaluate the impact of using different multifunctional acids.

Trans-aconitic acid (TAA) (Aldrich Cat #122750, TAA) was added to pentaerythritol and lactic acid to form the compositions described below. Each mixture was stirred in a 20 ml glass vial at 60-80° C. for 2 weeks and then transferred to aluminum pans to react at 150° C. overnight.

TAA-1: 1.02 g TAA, 4.06 g pentaerythritol, and 10.01 g lactic acid. Formed yellow solution after mixing, reacted to form slightly gelatinous dark yellow liquid after reacting at 150° C.

TAA-2: 2.48 g TAA, 2.50 g pentaerythritol, and 10.01 g lactic acid. Formed yellow solution after mixing, reacted at 150° C. to form hard, yellow plastic (57% w/w reaction yield).

TAA-3: 3.98 g TAA, 1.06 g pentaerythritol, and 10.03 g lactic acid. Formed yellow slurry after mixing for 2 weeks at 60-80° C., reacted at 150° C. to form dark orange, foamy solid (51% w/w reaction yield).

The chemical 1,2,3,4-butane tetracarboxylic acid (BTA) (Aldrich Cat #257303, BTA) was added to pentaerythritol and lactic acid to form the compositions described below. Each mixture was stirred in a 20 ml glass vial at 60-80° C. for 2 weeks and then transferred to aluminum pans to react at 150° C. overnight.

BTA-1: 1.05 g BTA, 4.00 g pentaerythritol, and 10.01 g lactic acid. Formed slurry after mixing for 2 weeks at 60-80° C., reacted to form yellow sticky gelatinous viscous solid reacted at 150° C. to form hard, yellow plastic (64% w/w reaction yield).

BTA-2: 2.49 g BTA, 2.51 g pentaerythritol, and 10.02 g lactic acid. Formed slurry after mixing for 2 weeks at 60-80° C., reacted at 150° C. to form hard, clear, yellow solid (63% w/w reaction yield).

BTA-3: 4.06 g BTA, 0.99 g pentaerythritol, and 10.02 g lactic acid. Formed slurry after mixing for 2 weeks at 60-80° C., reacted at 150° C. to form heterogeneous, yellow brittle solid (59% w/w reaction yield).

Example 35

Temperature-Dependent Degradation Rate

A series of pieces of pentaerythritol-citric acid-caprolactone-lactic acid (M317) cured plastic (flat disc ~1.5-2.0 g, 40-50 mm diameter) were cut. Each sample was placed in a 30 mL screw-top container with 15 mL of phosphate-buffered saline (Aldrich, Cat #P4417). The containers were then incubated in duplicate at preselected temperatures, and the pH was monitored. Within the first 24 hours, the pH dropped to below 4. When the pH reached around 2, the samples were noticeably softened to the point that each sample would collapse under its own weight when lifted out of the container. The pH values were measured until the samples became liquid. The sample held at 15° C. started to grow mold at around 7-week, and its pH did not reach 2.0 as of 26 weeks. Samples became soft (s in Table 10) faster as the temperature increases. Degradation also occurred faster at higher temperatures. At 60° C., degradation occurred in 2 weeks, while it took only hours to degrade at 100° C. For the 100° C. samples, the test was done with 15 ml of PBS in a screw-top glass container.

TABLE 10 pH changes of sample solutions as a function of time at various temperatures.

| Temp | Time (Week) | | | | | | | | |
|---|---|---|---|---|---|---|---|---|---|
| | 0 | 1 | 2 | 3 | 4 | 5 | 7 | 10 | 26 |
| 15° C. | 7.30 | 3.81 | 3.62 | 3.35 | 3.31 | 3.25 | 2.94 | 2.81 | 2.48 |
| 30° C. | 7.30 | 2.59 | 2.44 | 2.28 | 2.09 (s) | 2.19 | 2.03 | 1.98 (d) | |
| 37° C. | 7.30 | 2.29 | 2.14 | 1.98 (s) | 2.02 | 2.04 | 1.90 (d) | | |
| 60° C. | 7.30 | 1.77 (s) | 1.75 (d) | | | | | | |

| Temp | Time (Hour) | | | |
|---|---|---|---|---|
| | 0 | 3 | 6 | 22 |
| 100° C. | 7.51 | (s) | 1.94 | 1.94 (d) |

(s) indicates "softening" of the sample, and (d) indicates "degradation" of the sample to primarily liquid. The two samples for each time point were measured. The standard deviation of each measurement was less than 2%.

These examples indicate that other multifunctional acids may be used in place of citric acid and the type and nature of the multifunctional acid affect the formed plastic.

While the invention has been illustrated and described in detail in the previous description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, or more preferred utilized in the description above indicate that the feature so described may be more desirable, it nonetheless may not be necessary, and embodiments lacking the same may be contemplated as within the scope of the invention, the scope being defined by the claims that follow. In reading the claims, it is intended that when words such as "a," "an," "at least one," or "at least one portion" are used, there is no intention to limit the claim to only one item unless specifically stated to the contrary in the claim. When the language "at least a portion" and/or "a portion" is used, the item can include a portion and/or the entire item unless specifically stated to the contrary.

What is claimed is:

1. A composition comprising a solid crosslinked polyester having a crosslinked matrix, wherein the crosslinked polyester is environmentally degradable in less than about 180 days;
wherein the crosslinked matrix of the crosslinked polyester is formed by a self-catalyzed self-esterification reaction of a reactant mixture of one or more multi-hydroxylic alcohols, one or more hydroxy acids, one or more multi-carboxylic acid compounds, and optionally a cyclic ester;
wherein the one or more multi-hydroxylic alcohols have more than two hydroxyl groups per molecule;
wherein the hydroxy acid has one hydroxy group and one carboxylic acid group per molecule; and
wherein the one or more multi-carboxylic acid compounds have more than two carboxylic acid groups per molecule.

2. The composition of claim 1 wherein the weight percent of the one or more multi-hydroxylic alcohols is about 5% to about 85% of the reactant mixture, the weight percent of the one or more multi-carboxylic acid compounds is about 5% to about 85% of the reactant mixture, and the weight percent of the one or more hydroxy acids is about 10% to about 90% of the reactant mixture, with the proviso that the total weight percent of the combined multi-hydroxylic alcohols, the multi-carboxylic acids compounds, and the hydroxy acids does not exceed 100%.

3. The composition of claim 1 wherein the self-esterification reaction is self-catalyzed by the one or more hydroxy acids, the one or more multi-carboxylic acid compounds, or both the one or more hydroxy acids and the one or more multi-carboxylic acid compounds without additional metal or organic catalysts at a temperature from about 50° C. to about 300° C.

4. The composition of claim 3 wherein the temperature is from about 100° C. to about 150° C.

5. The composition of claim 1 wherein the crosslinked polyester has a Shore hardness score of at least 80.

6. The composition of claim 1 wherein the crosslinked polyester degrades upon exposure to naturally occurring water at 30° C. losing at least about 80% of its mass in about two months.

7. The composition of claim 1 wherein the one or more multi-hydroxylic alcohols is selected from the group consisting of pentaerythritol, dipentaerythritol, tripentaerythritol, glycerol, adonitol, cellulose, cellulose-ether derivatives, starch, poly(vinyl alcohol), dextran, alginic acid, hyaluronic acid, and chitosan.

8. The composition of claim 1 wherein the one or more multi-carboxylic acid compounds is selected from group consisting of citric acid, poly(acrylic acid), isocitric acid, aconitic acid, propane-1,2,3-tricarboxylic acid, and trimesic acid.

9. The composition of claim 1 wherein the one or more hydroxy acids is selected from the group consisting of lactic acid, glycolic acid, 3-hydroxypropionic acid, 3-hydroxybutanoic acid, and salicylic acid.

10. The composition of claim 1, wherein the cyclic ester is selected from the group consisting of caprolactone, propiolactone, butyrolactone, valerolactone, acetolactone, lactide, and glycolide.

11. The composition of claim 1 further comprising one or more additives to modify the mechanical properties of the crosslinked polyester, wherein the one or more additives are selected from the group consisting of polyols, chain-extenders, surfactants, cyclic esters, alcohols, metal-catalysts, poly (ethylene glycols), and hydroxy acids.

12. The composition of claim 1 further comprising one or more filler substances to alter one or more properties of the cross-linked polyester polymer, wherein the one or more filler substances are introduced prior to the self-catalyzed self-esterification reaction, and the one or more properties is selected from the group consisting of opacity, color, mechanical strength, stiffness, and porosity.

13. The composition of claim 12 wherein the filler is selected from the group consisting of silica, sand, salt, a cured polymer, fiberglass, cellulose, paper fiber, and aluminum.

14. The composition of claim 1 wherein the crosslinked matrix of the crosslinked polyester is formed by a self-catalyzed self-esterification reaction of a reaction mixture of the one or more multi-hydroxylic alcohols, the one or more hydroxy acids, the one or more multi-carboxylic acid compounds, and the cyclic ester.

\* \* \* \* \*